Figure 1:
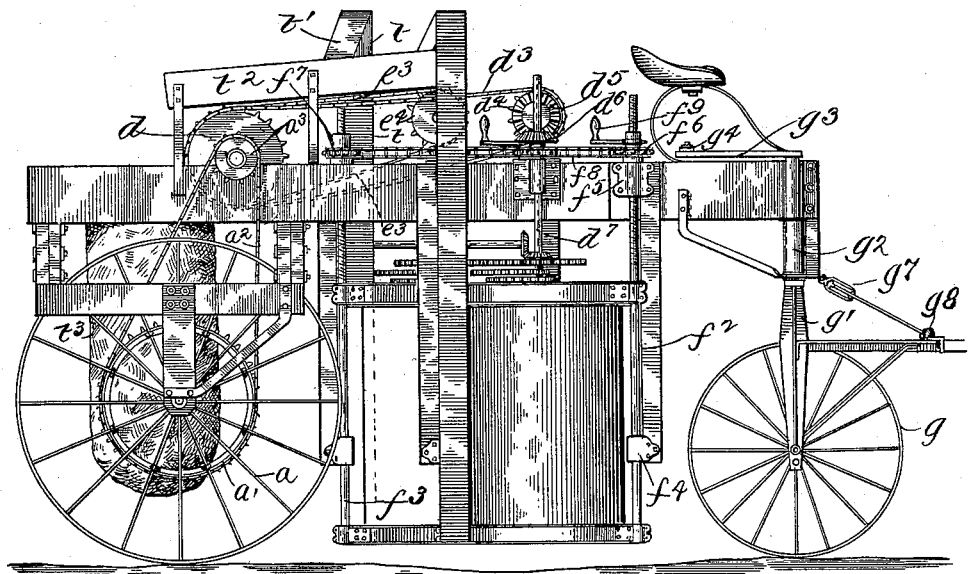

(No Model.) 6 Sheets—Sheet 1.

W. A. TURNER.
COTTON PICKING MACHINE.

No. 593,707. Patented Nov. 16, 1897.

Witnesses:
D. M. Tanner.
W. Clyde Jones.

Inventor:
William A. Turner.
By Barton & Brown
Attorneys.

(No Model.) 6 Sheets—Sheet 2.
W. A. TURNER.
COTTON PICKING MACHINE.
No. 593,707. Patented Nov. 16, 1897.
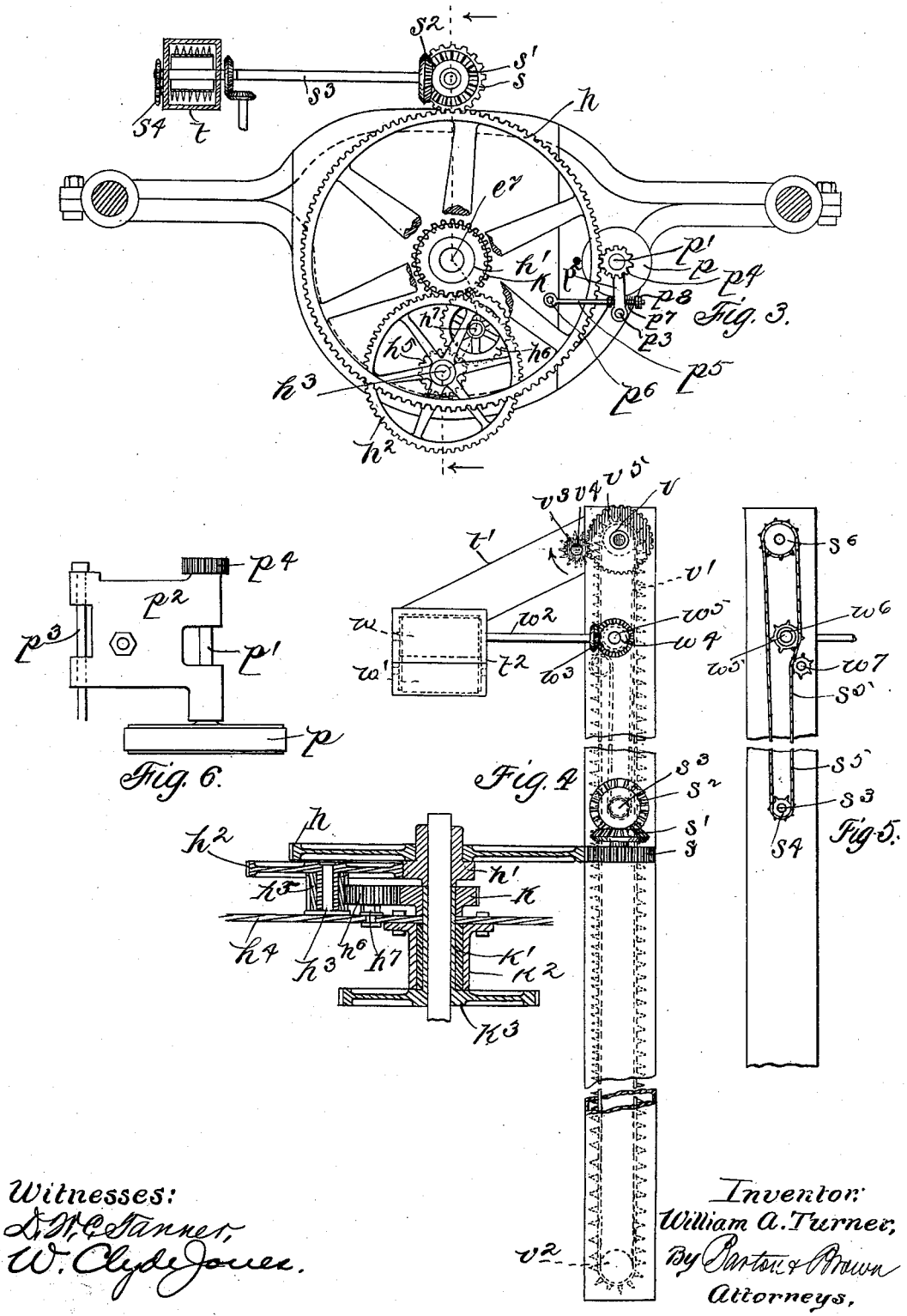
Witnesses:
D. H. C. Tanner,
W. Clyde Jones.
Inventor:
William A. Turner,
By Barton & Brown
Attorneys.

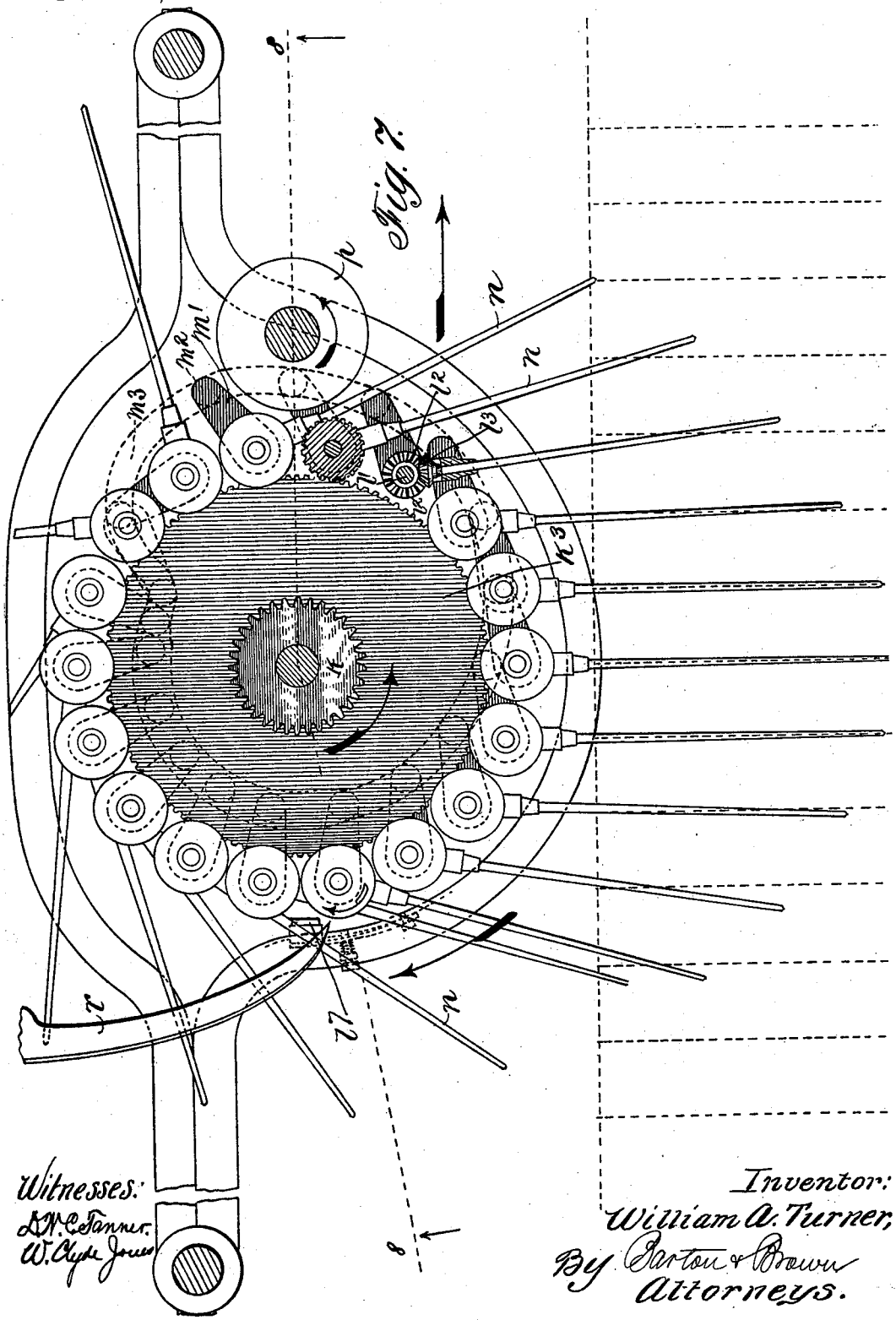

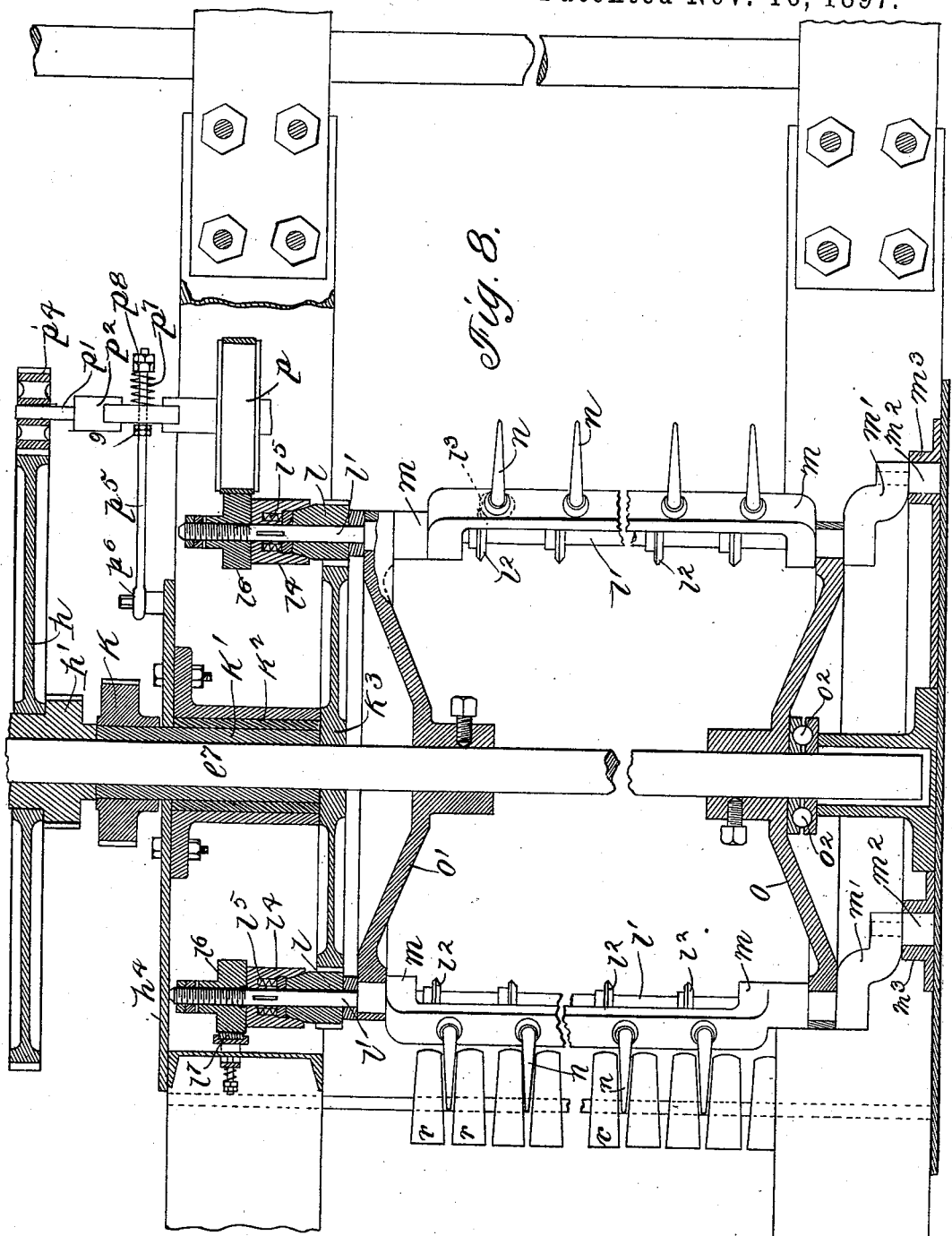

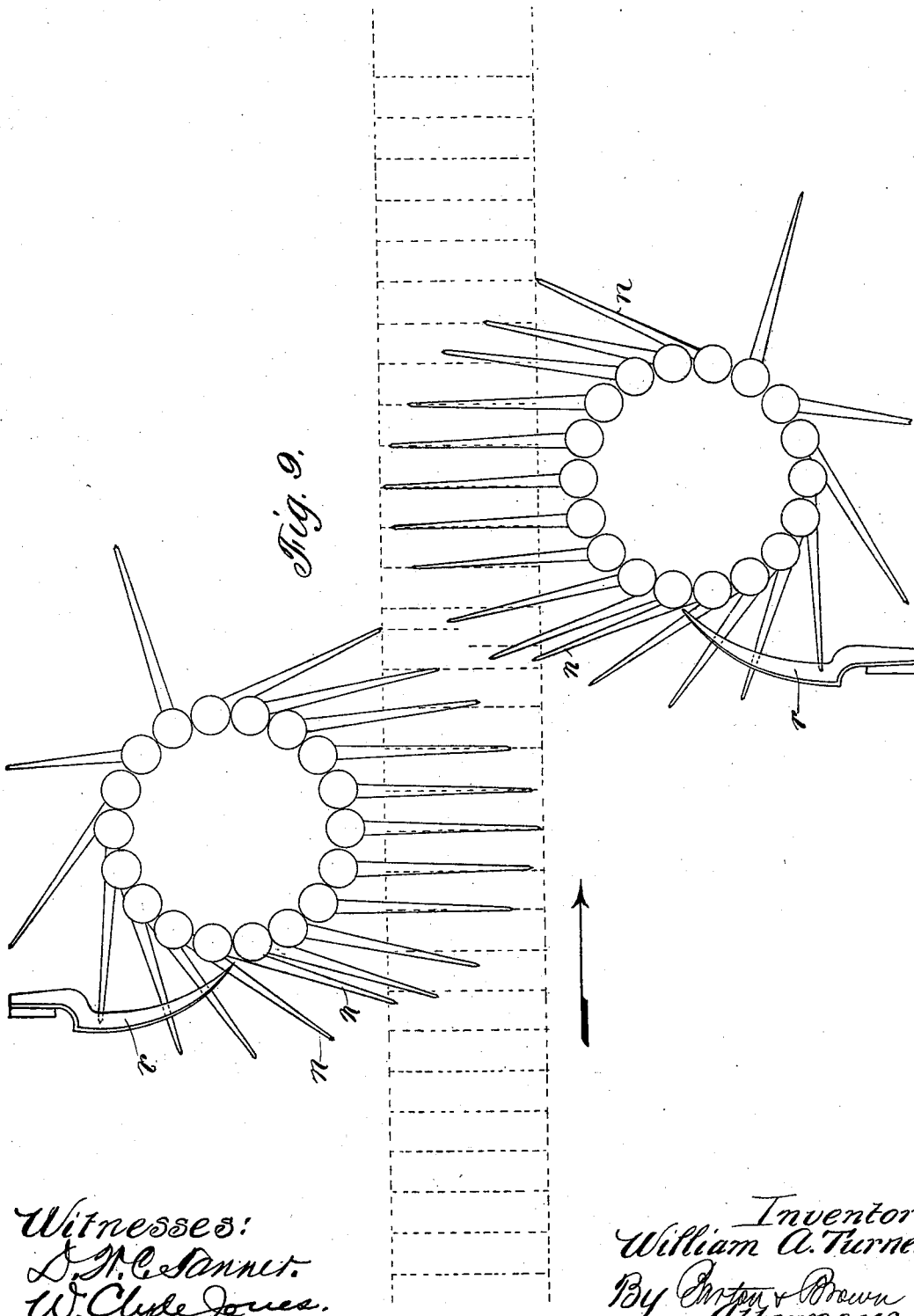

(No Model.) 6 Sheets—Sheet 6.
W. A. TURNER.
COTTON PICKING MACHINE.
No. 593,707. Patented Nov. 16, 1897.
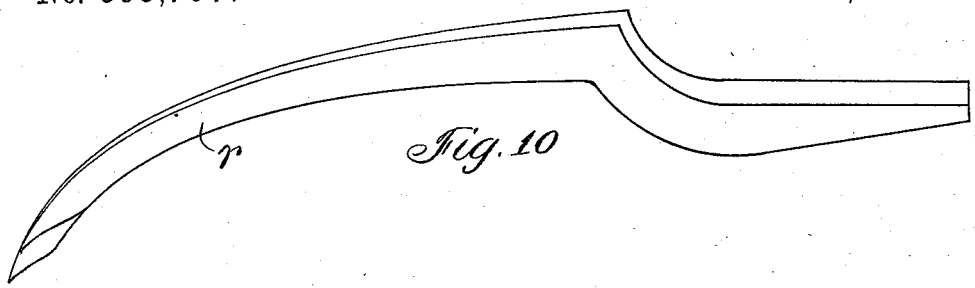
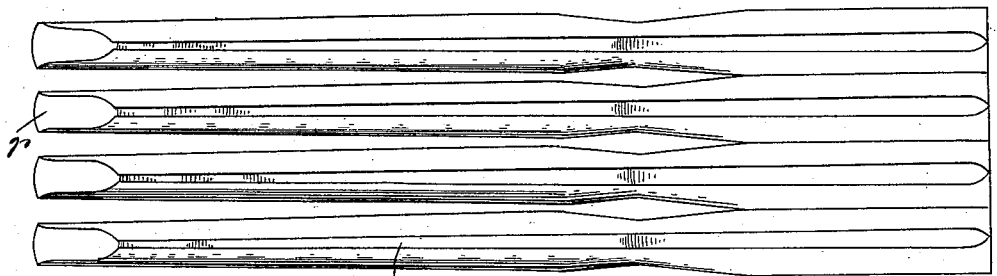
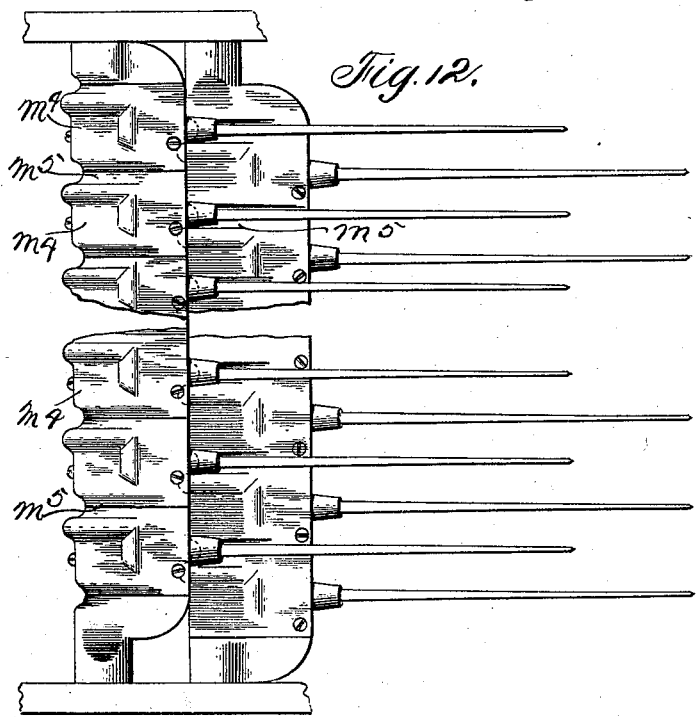
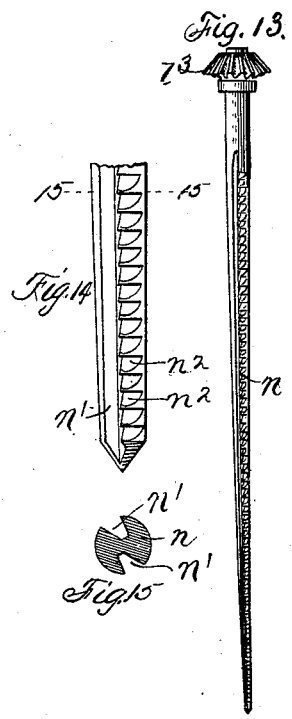
Witnesses:
Inventor:
William A. Turner,
By Barton + Brown
Attorneys.

UNITED STATES PATENT OFFICE.

WILLIAM A. TURNER, OF CHICAGO, ILLINOIS, ASSIGNOR TO THE CHICAGO COTTON PICKER COMPANY, OF SAME PLACE.

COTTON-PICKING MACHINE.

SPECIFICATION forming part of Letters Patent No. 593,707, dated November 16, 1897.

Application filed February 13, 1896. Serial No. 579,121. (No model.)

*To all whom it may concern:*

Be it known that I, WILLIAM A. TURNER, a citizen of the United States, residing at Chicago, in the county of Cook and State of Illinois, have invented a certain new and useful Improvement in Cotton-Picking Machines, (Case No. 2,) of which the following is a full, clear, concise, and exact description, reference being had to the accompanying drawings, forming a part of this specification.

My invention relates to a cotton-picking machine, its object being to provide an improved mechanism for picking cotton from the bolls on the cotton-plants.

In accordance with my invention the picking-fingers are axially rotated and are mounted upon vertical supports mounted in bearings at the ends, whereby they may be rocked to direct the fingers into the plants and to withdraw the same therefrom while moving in substantially straight lines to thus prevent the whipping of the bolls from the plants. At the upper ends of the vertical supports are provided pinions for rotating the picking-fingers, the pinions engaging a gear-wheel moving in the direction opposite to the direction of travel of the supports, whereby a high speed of rotation of the picking-fingers results. The picking-fingers after being withdrawn from the plants are passed longitudinally between the edges of cleaning fingers or slats, the picking-fingers being tapered to facilitate the withdrawal of the cotton, while the width of the cleaning-fingers is increased to accommodate the continuously-decreasing thickness of the picking-fingers as the same pass through the cleaning-fingers. In order that the picking-fingers may not interfere with one another in their movement, the picking-fingers on adjacent supports are arranged in different planes, and the supports are formed to permit the picking-fingers to lie close to the axis of the adjacent support. Clutches are provided for connecting the picking-fingers with the driving-gear and for disconnecting the same therefrom, so that the picking-fingers are axially rotated while within the plants, but remain at rest, as concerns axial rotation, while passing between the cleaning-fingers.

My invention also comprehends other features of construction, hereinafter referred to.

Figure 2:
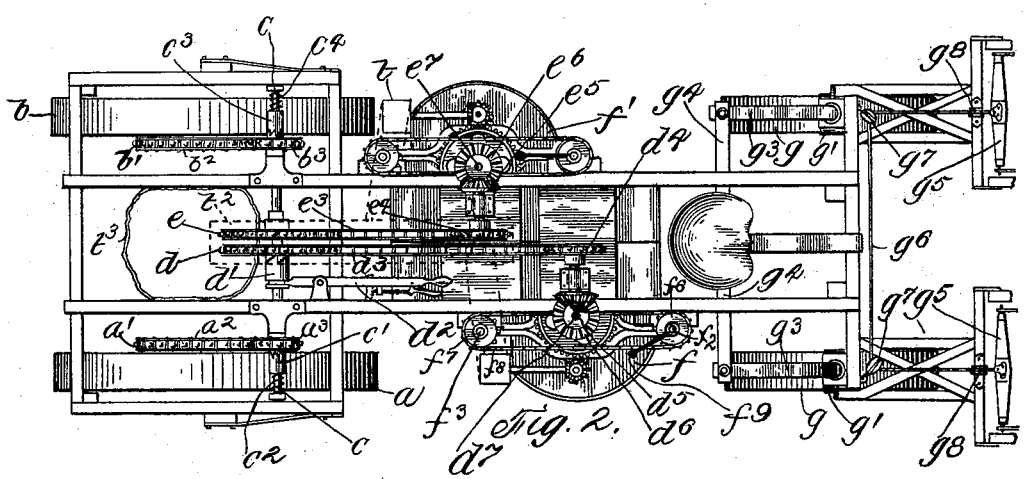

Referring to the accompanying drawings, Figure 1 is a view in elevation of the cotton-picking machine of my invention. Fig. 2 is a plan view thereof. Fig. 3 is a plan view of a portion of the mechanism for imparting rotation to the picking-fingers and for operating the conveyers. Fig. 4 is a view in elevation thereof, partially in section. Fig. 5 is a view of a portion of one of the conveyers as seen from the side opposite that illustrated in Fig. 4. Fig. 6 is a detail view of the mechanism for actuating the clutches controlling the rotation of the picking-fingers. Fig. 7 is a plan view illustrating the mechanism for rotating the picking-fingers and for rocking the supports that carry the picking-fingers. Fig. 8 is a sectional view on line 8 8, Fig. 7. Fig. 9 is a diagram illustrating the positions of the two sets of picking-fingers. Fig. 10 is a detached view of one of the cleaning-fingers. Fig. 11 is a view of the cleaning-fingers arranged in position. Fig. 12 is a view illustrating two of the rocking supports carrying the picking-fingers, illustrating the manner in which the casings are formed to admit of the picking-fingers lying close against the side of an adjacent support. Fig. 13 is a view of one of the picking-fingers. Fig. 14 is a partial view thereof somewhat enlarged. Fig. 15 is a sectional view on line 15 15, Fig. 14.

Like letters refer to like parts in the several figures.

Referring to Figs. 1 and 2, sprocket-wheels $a'$ $b'$ are mounted upon the rear wheels $a$ $b$, respectively, and are geared by means of sprocket-chains $a^2$ $b^2$ with sprocket-wheels $a^3$ $b^3$, loosely mounted upon the shaft $c$. The hub of the wheel $a^3$ is provided with teeth at the edge adapted to intermesh with teeth carried upon a sliding collar $c'$, splined to the shaft $c$ and pressed against the hub of the wheel $a^3$ by means of a spring $c^2$. Likewise a toothed collar $c^3$, splined to the shaft $c$, engages teeth upon the hub of the wheel $b^3$ and is maintained in engagement by means of the spring $c^4$. As the vehicle advances the wheels $a^3$ $b^3$ are rotated, and through their engagement with collars $c'$ and $c^3$, respectively, the shaft $c$ is rotated. The collars $c'$ $c^3$ permit the movement of one of the wheels $a^3$ $b^3$ faster than the other—as, for instance, when the machine is turning a curve—in which case one or the other of the collars slides over the teeth of the hub of the wheel with which it is in contact, thus causing the shaft $c$ to be driven by the teeth of the one of the wheels $a^3$ $b^3$ having the greater speed of rotation.

Mounted loosely upon the shaft $c$ are sprocket-wheels $d$ and $e$, the wheels $d$ and $e$ being mounted upon a common hub provided with teeth adapted to engage with teeth upon a sliding collar $d'$, splined to the shaft $c$ and adapted to be moved into or out of engagement with the hub of the wheels by means of a hand-lever $d^2$. A sprocket-chain $d^3$ passes over wheel $d$ and over a wheel $d^4$, mounted upon a shaft carrying upon the other end a bevel-gear $d^5$, meshing with a bevel-gear $d^6$, carried upon a vertical shaft $d^7$. Likewise a chain $e^3$ passes over wheel $e$ and wheel $e^4$, the wheel $e^4$ being mounted upon a shaft carrying a bevel-gear $e^5$, intermeshing with bevel-gear $e^6$, mounted upon a vertical shaft $e^7$.

Motion is imparted to the picking mechanism upon one side of the machine through the agency of the shaft $d^7$, while the picking mechanism upon the other side of the machine is operated through the agency of the shaft $e^7$.

The picking mechanism upon one side of the machine is mounted within the cylindrical casing $f$ and upon the other side within the cylindrical casing $f'$. The casing $f$ is supported upon vertical rods $f^2$ $f^3$, the rod $f^2$ being guided in its movement by bearings $f^4$ and $f^5$. The rods $f^2$ and $f^3$ are threaded at the upper ends and sprocket-wheels $f^6$ $f^7$, respectively, are screwed upon the ends thereof, the sprocket-wheels being connected by a chain $f^8$ and one of the wheels $f^6$ being provided with a handle $f^9$, whereby the wheels may be rotated in unison to raise the rods $f^2$ $f^3$ to thereby adjust the height of the picking mechanism. The main shaft $d^7$ of the picking mechanism is splined to the bevel-gear $d^6$, whereby the shaft $d^7$ may move longitudinally with reference to the said bevel-gear as the picking mechanism is raised and lowered. The casing $f'$ upon the opposite side of the machine is similarly supported, and similar mechanism is provided for raising and lowering the same.

In cotton-picking machines as heretofore constructed it has been usual to propel the machine by means of a team of horses, the horses straddling the row of cotton-plants. Considerable trouble has been experienced, due to the fact that the neck-yoke, the tongue, and the whiffletree rub against the tops of the plants and disengage more or less of the cotton therefrom; and it is the object of the present invention to overcome this objection by dispensing with the tongue entirely. The front wheels of the vehicle are mounted to rotate each about a vertical axis, the axles of the two wheels being joined together, whereby they may turn in unison. A pair of shafts is provided in connection with each wheel, and one of the horses is harnessed in each pair of shafts. In this manner a clear space is provided between the horses, and the shafts may be placed at such a distance apart that none of the mechanism comes in contact with the row of cotton-plants. The front wheels $g$ $g$ are each mounted in a fork $g'$, journaled at the upper end in a bearing $g^2$. Each of the forks is provided at the upper end with an extension $g^3$, lying at right angles to the fork and extending toward the rear of the machine. The ends of the extensions $g^3$ $g^3$ are connected together by a link or bar $g^4$. The wheels are thus caused to move in unison and to remain continuously parallel. The shafts are mounted directly upon the forks $g'$, and the singletrees $g^5$ $g^5$ of the two pairs of shafts are mounted upon the opposite ends of a rope or chain $g^6$, passing over pulleys $g^7$ $g^7$ and beneath rollers $g^8$ $g^8$. The pull of the two horses is thus equalized by means of the rope and pulleys.

I will describe in detail the picking mechanism upon the left of the machine, the picking mechanism upon the opposite side of the machine being the same in all respects as that upon the left.

Referring more particularly to Figs. 3, 4, 7, and 8, a gear-wheel $h$ is mounted upon the shaft $e^7$, and beneath the gear-wheel $h$ and moving therewith is provided a pinion $h'$, which meshes with a gear-wheel $h^2$, mounted upon a stud $h^3$, carried upon the frame-plate $h^4$. A pinion $h^5$ is mounted to move with the gear-wheel $h^2$ and meshes with an idler $h^6$, mounted upon a stud $h^7$, the idler in turn meshing with a pinion $k$, mounted upon a sleeve $k'$, journaled to rotate in a bearing $k^2$, the sleeve carrying upon the lower end a gear-wheel $k^3$. Gear-wheel $k^3$ meshes with a series of pinions $l$ $l$, mounted loosely upon a series of vertical shafts $l'$. The shafts $l'$ are journaled to rotate in bearings provided in the ends of the vertical supports $m$, which carry the picking-fingers $n$ $n$. The supports $m$ are journaled at the ends in the plates $o$ $o'$, which are secured to the main shaft $e^7$, the lower plate resting upon ball-bearings $o^2$, which support the weight of the rotating mechanism and reduce friction to a minimum. Upon the lower ends of the supports $m$ are provided arms $m'$, carrying rollers $m^2$, which move in a cam-groove $m^3$, thus rocking the vertical supports $m$ in their bearings for the purpose hereinafter described. Upon the shafts $l'$ $l'$ are mounted bevel-gears $l^2$ $l^2$, each of the bevel-gears meshing with a bevel-pinion $l^3$, mounted upon the end of a picking-finger $n$, the picking-fingers being journaled in the vertical supports $m$. As the shafts $l'$ are rotated rotation is imparted to the picking-fingers $n$ through the agency of the bevel-gears $l^2$ and pinions $l^3$.

It is desirable that the cotton-picking fingers rotate only during the time that they are within the cotton-plants, the fingers having no axial rotation during the remainder of their travel. To secure this rotation of the fingers during a portion only of the travel, a clutch is provided in connection with each of the vertical supports adapted to be thrown into operation at the proper time to connect the vertical shafts $l'$ with a continuously-driven part to thus axially rotate the fingers, the clutch being operated to disengage the shaft at another point in the travel to thus bring the fingers to rest. The pinions $l\ l$, mounted upon the upper ends of the shafts $l'\ l'$, are arranged at the upper end in the form of a frustum of a cone, and a collar $l^4$ is provided with interior walls adapted to engage the cone-shaped end of the pinion $l$ when the collar is thrust downward. A spring $l^5$ is provided within the collar $l^4$, resting between the pinion $l$ and the collar and normally acting to move the collar away from the pinion. The collar $l^4$ is splined to the shaft $l'$ and rotates therewith. The pinion $l$ is mounted loosely upon the shaft $l'$ and is continuously rotated by means of the gear-wheel $k^3$. When the collar $l^4$ is thrust against the pinion $l$, the collar is locked to the pinion and moves therewith, and being splined to the shaft $l'$ the shaft is in consequence rotated. When the collar $l^4$ is moved out of engagement with the pinion $l$, the pinion is rotated loosely upon the shaft $l'$ and no rotation of the said shaft results.

Above the collar $l^4$ is provided a nut $l^6$, engaging threads provided upon the shaft $l'$, the nut being provided with a circular periphery adapted to engage a shoe $l^7$, preferably having a leather face, the shoe being mounted upon the frame of the machine. Looking at the shaft $l'$ upon the left of Fig. 8 and its accompanying parts, the shaft is moving away from the observer, and as the periphery of the nut $l^6$ comes in contact with the shoe $l^7$ the nut is rotated in a direction to move the same away from the collar $l^4$—that is, looking at the shaft $l'$ from above the nut $l^6$ is rotated in contra-clockwise direction. The spring $l^5$ then acts to move the collar $l^4$ out of engagement with the pinion $l$, and the pinion $l$ rotates loosely upon the shaft $l'$ without causing the rotation of said shaft. When the shaft $l'$ reaches the position of the shaft upon the right of Fig. 8 and is moving toward the observer, a rotating wheel $p$ engages the periphery of the nut $l^6$ and rotates the same in clockwise direction, thus thrusting the nut $l^6$ against the collar $l^4$ and causing the latter to engage the pinion $l$ and thereby produce rotation of the shaft $l'$. Thus as each of the shafts $l'$ comes opposite the rotating wheel $p$ the clutch is thrown into gear to rotate the shaft and as the shaft reaches the position of the shoe $l^7$ the clutch is disengaged and the rotation of the shaft ceases. The wheel $p$ is preferably provided with a periphery of leather or similar material.

As illustrated more clearly in Figs. 3, 6, and 8, the rotating wheel $p$ is mounted upon a shaft $p'$, journaled in a frame $p^2$, hinged or pivoted to a rod $p^3$, mounted upon the frame of the machine. At the upper end of the shaft $p'$ is provided a pinion $p^4$, which meshes with a gear-wheel $h$. A rod $p^5$, pivoted at $p^6$ to the frame of the machine, passes through an opening provided in the hinged frame $p^2$, and a coiled spring $p^7$ is situated between nuts $p^8$, provided upon the end of the rod $p^5$, and the frame $p^2$, thus yieldingly pressing the wheel $p$ toward the nuts $l^6$, carried upon the ends of the shafts $l'$. Check-nuts $p^9$ are provided upon the rod $p^5$ to limit the movement of the frame $p^2$.

It is essential that the picking-fingers be thrust into the plants and withdrawn therefrom while moving substantially along parallel lines extending transversely to the row in order that the cotton-bolls may not be whipped from the plants. To secure this movement of the fingers, the vertical supports $m$, upon which the fingers are mounted, are rotatably supported at their ends, whereby they may be rocked or rotated, and each of the supports carries at the lower end an arm $m'$, upon which is mounted a roller $m^2$, moving in a cam-guide $m^3$.

Referring more particularly to Fig. 7, the picking mechanism is moving toward the right and the supports carrying the picking-fingers are moving in a circular path in clockwise direction, the gear-wheel $k^3$ moving in contra-clockwise direction and engaging the pinions upon the ends of the vertical shafts $l'$ to produce rotation of the picking-fingers. The circular movement of the supports is so timed relatively to the forward travel of the machine that the fingers enter and leave the plants substantially along straight lines, the fingers thus having little or no lateral movement through the plants. It will be observed that the cam-guide $m^3$ is so formed that the picking-fingers $n\ n$ upon the right point toward the row of plants while being inserted therein, that the fingers toward the middle of the figure extend perpendicularly through the row, while the fingers upon the left, shown as being withdrawn from the plant, are withdrawn with the ends pointing toward the row. The fingers are thus thrust into and withdrawn from the plant while moving in a longitudinal direction, and in order to secure this longitudinal movement of the fingers it is necessary that the fingers be capable of occupying a position close against the adjacent supports.

After the picking-fingers have been withdrawn from the plants and are covered with cotton-bolls clinging thereto the fingers are drawn through the series of cleaning fingers or slats $r\ r$, the edges of the fingers being situated at a distance apart to permit the passage of the fingers therethrough and serving to strip off the clinging cotton, the cotton falling upon a conveyer, hereinafter described, and carried to the cotton-receptacle. While the picking-fingers are passing between the cleaning-fingers, the rollers $m^2$ do not engage the side walls of the cam-groove, the cam-groove being widened at this point. The pressure exerted upon the picking-fingers as they pass through the cleaning-fingers forces the picking-fingers against the sides of the adjacent supports, and in order that the fingers may lie as close together as possible the fingers upon adjacent supports are situated in different horizontal planes.

As illustrated more clearly in Figs. 8 and 12, the fingers upon one support lie in planes midway between the planes in which the fingers upon the adjacent support lie. The bevel-gears for imparting movement to the fingers necessarily occupy considerable space and tend to give to the supports a considerable diameter or lateral dimension, which prevents the fingers from lying close to the axis of the adjacent support. By having the fingers of adjacent supports alternate, as above described, and adapted to lie between the bevel-gears upon the adjacent support the fingers may be brought very close to the axis of the adjacent support. Casings $m^4 m^4$ are provided upon the supports, as illustrated in Fig. 12, the casings being provided with bulging portions to accommodate the gear-wheels $l^2 l^3$ and being constructed to form depressions or grooves $m^5 m^5$, in which the fingers carried upon an adjacent support are adapted to lie, to thus bring the fingers as near as possible to the axis of the adjacent support. After the picking-fingers have passed through the cleaning-fingers the rollers $m^2$ again engage the walls of the cam-groove $m$ and are guided thereby to impart the proper rocking movement to the vertical supports carrying the picking-fingers.

It is of importance in cotton-picking machines to have each finger perform as many rotations as possible while within the cotton-plant, as the efficiency in the removal of the cotton depends upon the extent to which the picking-finger is rotated while within the plant.

By the provision of the gear-wheel $k^3$, adapted to rotate in a direction opposite to that in which the supports move, any desired speed may be imparted to the pinions $l$ rotating the picking-fingers.

The picking-fingers $n n$ are made tapering, being smaller at the tip, whereby the cotton may be readily removed as the picking-fingers pass between the cleaning-fingers. Likewise the space between the edges of the cleaning-fingers tapers, as illustrated more clearly in Fig. 11. The object of thus tapering the cleaning-fingers is that the picking-fingers may closely engage the cleaning-fingers at all points of their travel through the cleaning-fingers. By referring to Fig. 7 it will be observed that as the picking-finger passes between the cleaning-fingers the picking-finger is engaged by the cleaning-fingers at a point near the rear end of the picking-finger, which is of greater thickness than the tip, and as the picking-finger continues its travel the portion of the picking-finger resting between the edges of the cleaning-fingers continuously decreases in thickness. In order that the cleaning-fingers may accommodate themselves to the tapering picking-fingers, the cleaning-fingers are likewise made tapering.

The picking-finger which I preferably employ is illustrated in Figs. 13, 14, and 15, and is preferably made in one piece, the bevel-gear $l^3$ being screwed directly to the end of the picking-finger. The picking-finger is provided with diametrically-situated longitudinal slots $n' n'$, transverse cuts or grooves $n^2 n^2$ being formed at one edge of each slot to constitute teeth, the ends of which project in the direction of rotation. The opposite wall of the slot forms a guard to prevent the tearing of the plant by means of the teeth. Longitudinal rows of teeth are thus provided upon each picking-finger, and all of the parts of the picking-finger are formed from one piece of metal. As the finger is rotated the teeth engage the fibers of the cotton-bolls, and as the teeth extend toward the tip of the finger they may be readily withdrawn when the finger passes between the cleaning-fingers.

As illustrated in Figs. 3 and 4, a gear-wheel $s$ meshes with the gear-wheel $h$ and is mounted to rotate with a bevel-gear $s'$, which in turn meshes with a bevel-gear $s^2$, mounted upon a shaft $s^3$, which extends through the conveyer-box $t$ and carries upon its outer end a small sprocket-wheel $s^4$. A sprocket-chain $s^5$ passes over the wheel $s^4$ and around a sprocket-wheel $s^6$, mounted upon a shaft at the upper end of the conveyer-box $t$. Mounted to rotate with the sprocket-wheel $s^6$ is a drum $v$, over which passes a conveyer-belt $v'$, the belt passing at the lower end of the conveyer-box over a drum $v^2$. The belt $v'$ is provided with teeth or projections, which engage the cotton and carry the same upward over the drum $v$, from which it is removed by the rotating wheel $v^3$, the wheel $v^3$ rotating in the direction indicated by the arrow and acting to remove the cotton from the belt $v'$ and to throw the same into the oblique trough $t'$, which carries the cotton to the horizontal conveyer-box $t^2$, the end of which is situated above the receptacle or sack $t^3$, Figs. 1 and 2. Mounted to rotate with the wheel $v^3$ is a pinion $v^4$, meshing with a gear-wheel $v^5$, mounted to rotate with the drum $v$, motion being thus imparted to the wheel $v^3$. Within the conveyer-box $t^2$ is a conveyer-belt, which passes about drums $w w'$, situated at the opposite ends thereof, the drum $w$ being mounted upon a shaft $w^2$, upon the end of which is a bevel-gear $w^3$, engaging a bevel-gear $w^4$, mounted upon a shaft $w^5$, which extends through the conveyer-box $t$ and carries upon its opposite end a sprocket-wheel $w^6$, adapted to be engaged by the sprocket-chain $s^5$. An idler $w^7$ maintains the chain $s^5$ in engagement with the sprocket-wheel $w^6$.

Having described my invention, what I claim as new, and desire to secure by Letters Patent, is—

1. In a cotton-picking machine, the combination with vertical supports of rotating circular end plates in which said supports are journaled, a vertical shaft carried by each of said supports, axially-rotating picking-fingers mounted upon said supports and geared to the said vertical shafts, a loosely-mounted pinion provided upon the upper end of each of said shafts, a clutch-collar provided upon each of said shafts and adapted in one position to engage said pinion to lock the same to the shaft and in another position to release the pinion to permit the same to rotate loosely upon the shaft, a gear-wheel engaging the pinions of all the shafts, means for rotating said gear-wheel in a direction opposite to the direction of travel of the supports, means for moving the collars into engagement with the pinions as the aforesaid picker-fingers enter the plants, means for moving the collars out of engagement with the pinions when said picking-fingers are withdrawn from the plants, means for axially rotating the supports as the fingers are passed into and withdrawn from the plants, and cleaning-fingers between which the picking-fingers are passed longitudinally to remove the cotton therefrom, substantially as described.

2. In a cotton-picking machine, the combination with a series of supports mounted to travel in a circular path, said supports being rotatably journaled at the ends, of picking-fingers mounted upon each of said supports with their axes perpendicular to the axis of the support, the picking-fingers of adjacent supports lying in alternate horizontal planes, means for rotating said picking-fingers on their individual axes, means for rotating said supports individually as the fingers enter and leave the plants to cause the fingers to enter and leave the plants while moving in a longitudinal direction, cleaning or stripping fingers between the edges of which the picking-fingers are adapted to be moved to strip the cotton therefrom, means for rotating said supports to pass the picking-fingers through the cleaning-fingers while moving in a longitudinal direction, and means for bringing the picking-fingers to rest as regards axial rotation while passing between the cleaning-fingers; substantially as described.

3. In a cotton-picking machine, the combination with vertical supports arranged to move in a circular path and rotatably mounted at the ends, of picking-fingers mounted upon said supports, the picking-fingers of adjacent supports lying in alternate horizontal planes, means for rotating said supports as the fingers pass into and leave the plants to cause the same to travel in a longitudinal direction in entering and leaving the plants, and cleaning or stripping fingers between the edges of which said picking-fingers are adapted to be passed while moving in a longitudinal direction; substantially as described.

4. In a cotton-picking machine, the combination with vertical supports arranged to move in a circular path and rotatably mounted at the ends, of axially-rotating picking-fingers mounted upon said supports, a vertical shaft carried upon each of said supports, a series of bevel-gears mounted upon each of said shafts, a bevel-pinion engaging each of said bevel-gears and mounted upon the end of a picking-finger, the picking-fingers of adjacent supports being situated in alternate horizontal planes—that is, a picking-finger of one support lying between two picking-fingers of an adjacent support—casings for said supports inclosing said gears and pinions, said casings being provided with depressions at positions between the bevel-gears, the picking-finger of an adjacent support being adapted to lie within said depression when the supports are rotated; whereby the picking-fingers of any support may be brought close to the axis of an adjacent support and the insertion of the picking-fingers into the plants and the removal therefrom may be accomplished while the picking-fingers are traveling in a longitudinal direction; substantially as described.

5. A cotton-picking finger, comprising a shank formed of solid metal tapering from the butt toward the tip, said shank being provided with a slot extending in a longitudinal direction, one edge of said slot being cut away transversely to form a series of teeth, the opposite wall of the slot serving as a guard; substantially as described.

6. A cotton-picking finger, comprising a shank formed of solid metal tapering from the butt toward the tip, said shank being provided with diametrically-situated longitudinally-extending slots, a series of teeth being formed upon one wall of each of said slots, the opposite wall serving as a guard which, as the picking-finger rotates, moves in advance of the series of teeth; substantially as described.

7. In a cotton-picking machine, the combination with vertical supports, of cotton-picking fingers mounted thereon and extending perpendicular thereto, each of said picking-fingers tapering from the butt toward the tip, of a series of cleaning or stripping fingers supported at one end and arranged at a distance apart to permit the passage of the picking-fingers between the edges thereof, the edges of the cleaning-fingers tapering from the butts toward the tips of the cleaning-fingers; whereby, as the tapering picking-fingers pass between the cleaning-fingers, the continuously-diminishing distance between the edges of the cleaning-fingers conforms to the continuously-decreasing dimension of the picking-finger lying between the edges of the cleaning-fingers; substantially as described.

8. In a cotton-picking machine, the combination with a rotating shaft, of a series of vertical supports mounted to move therewith, a shaft carried upon each of said supports, a series of picking-fingers mounted upon each of said supports and geared to said shaft, a loosely-mounted pinion provided upon the upper end of each of said shafts, a clutch-collar splined to each of said shafts and adapted in one position to engage said pinion to lock the same to the shaft and in another position to release the pinion and to permit the same to rotate loosely upon the shaft, a gear-wheel engaging the pinions of all of the shafts and continuously rotating the same, means for rotating said gear-wheel independently of said supports, means for moving the collars into engagement with the pinions at one point in the travel of the supports, and means for moving the collars out of engagement with the pinions at another point of the travel of the supports; whereby the picking-fingers are alternately rotated and brought to rest; substantially as described.

9. In a cotton-picking machine, the combination with the shaft $e^7$, of the end plates $o\ o'$ mounted thereon, the vertical supports $m\ m$ rotatably mounted in said end plates, the shaft $l'$ provided upon each of said supports and geared to the picking-fingers, the pinion $l$, collar $l^4$, spring $l^5$, and nuts $l^6$ mounted upon each of said shafts, the shoe $l^7$ adapted to engage the peripheries of the nuts $l^6$, the rotating wheel $p$ adapted to engage the peripheries of said nuts $l^6$, and the gear-wheel $k^3$ meshing with the pinions $l$ and traveling in a direction opposite to the direction of travel of the shaft $e^7$; substantially as described.

10. In a cotton-picking machine, the combination with the two front wheels, each independently mounted upon a fork journaled to rotate about a vertical axis, of a connection between said forks, whereby the same are caused to rotate in unison, a pair of shafts connected to each of said forks, singletrees disposed between the members of each pair of shafts and a rope connecting said singletrees passing over pulley mechanism, whereby the pull of the two horses is equalized; substantially as described.

11. In a cotton-picking machine, the combination with a rotating shaft, of a series of vertical supports mounted to move therewith, a shaft carried upon each of said supports, a series of picking-fingers mounted upon each of said supports and geared to said shaft, a loosely-mounted pinion connected with each of said shafts, a clutch associated with each shaft and adapted in one position to engage said pinion to lock the same in engagement with the shaft and in another position to release the pinion and to permit the same to rotate independently of the shaft, a gear-wheel engaging the pinions of all of the shafts and continuously rotating the same, means for rotating said gear independently of said vertical supports, means for actuating said clutches at one point in the travel of the supports to bring the gear-wheels into fixed relative positions with their shafts whereby rotary motion imparted to the gear-wheels is imparted to said shafts, and means for actuating said clutches at another point in the travel of the supports to free the supports from the influence of the gear-wheels; whereby the picking-fingers are alternately rotated and brought to rest, substantially as described.

12. In a cotton-picking machine, the combination with a series of vertical supports, of a shaft carried upon each of said supports, a series of picking-fingers arranged to be rotated by said shaft, a pinion in connection with each shaft, means for controlling the operative relation of said pinions with said shafts, a gear-wheel engaging and continuously rotating all of said pinions, mechanism for operating said gear-wheel independently of the supports, means for operating the aforesaid means at one point in the travel of the supports to bring the said pinions into active engagement with said shafts, whereby said shafts and picker-fingers are rotated, and means for actuating the first aforesaid means to remove said pinions from active engagement with said shafts at another point in the travel of the supports, whereby said shafts and the picker-fingers associated therewith are brought to rest, the picking-fingers being thus alternately rotated and brought to rest, substantially as described.

13. A cotton-picking finger, comprising a shank formed of solid metal, said shank being provided with a slot extending lengthwise thereof, one edge of said slot being cut away transversely to form a series of teeth, the opposite wall of the slot serving as a guard, substantially as described.

In witness whereof I hereunto subscribe my name this 1st day of February, A. D. 1896.

WILLIAM A. TURNER.

Witnesses:
W. CLYDE JONES,
A. L. LAWRENCE.